(12) United States Patent
Kalyanaraman et al.

(10) Patent No.: US 10,721,163 B1
(45) Date of Patent: Jul. 21, 2020

(54) SPANNING TREE PROTOCOL BRIDGE-BASED LINK SELECTION SYSTEM

(71) Applicant: Dell Products L.P., Round Rock, TX (US)

(72) Inventors: Vigneshwar Kalyanaraman, Tamil Nadu (IN); Aravind Prasad Sridharan, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/355,181

(22) Filed: Mar. 15, 2019

(51) Int. Cl.
*H04L 12/753* (2013.01)
*H04L 12/709* (2013.01)

(52) U.S. Cl.
CPC ............ *H04L 45/48* (2013.01); *H04L 45/245* (2013.01)

(58) Field of Classification Search
CPC ............................... H04L 45/48; H04L 45/245
See application file for complete search history.

(56) References Cited

U.S. PATENT DOCUMENTS

| | | | | |
|---|---|---|---|---|
| 6,473,403 B1* | 10/2002 | Bare | ........................ | H04L 45/12 370/236 |
| 6,611,502 B1* | 8/2003 | Seaman | ................. | H04L 12/462 370/256 |
| 8,204,061 B1* | 6/2012 | Sane | ...................... | H04L 49/557 370/256 |
| 2004/0190454 A1* | 9/2004 | Higasiyama | ........ | H04L 12/4625 370/238 |
| 2005/0243713 A1* | 11/2005 | Okuda | .................... | H04L 47/10 370/216 |
| 2010/0097926 A1* | 4/2010 | Huang | ................ | G06F 11/2005 370/219 |
| 2010/0232322 A1* | 9/2010 | Umayabashi | ......... | H04L 12/462 370/256 |
| 2012/0033672 A1* | 2/2012 | Page | ..................... | H04L 45/245 370/395.53 |
| 2012/0320926 A1* | 12/2012 | Kamath | .................. | H04L 45/66 370/401 |
| 2019/0182878 A1* | 6/2019 | Huang | ................ | H04M 1/7253 |

* cited by examiner

*Primary Examiner* — Saad A. Waqas
(74) *Attorney, Agent, or Firm* — Haynes and Boone, LLP

(57) ABSTRACT

An STP link selection system includes a first and second designated switch devices providing different paths to a root switch device. A non-designated switch device receives a first communication from the first designated switch device identifying a first root path cost for a first link to the first designated switch device and a first designated switch device identifier, and designates the first link as an active link for communications to the root switch device. The non-designated switch device subsequently receives a second communication from the second designated switch device identifying a second root path cost for a second link to the second designated switch device that is equal to the first root path cost, and a second designated switch device identifier that is lower than the first designated switch device identifier. In response, the non-designated switch device designates the second link as a non-active link upon which communications are blocked.

17 Claims, 15 Drawing Sheets

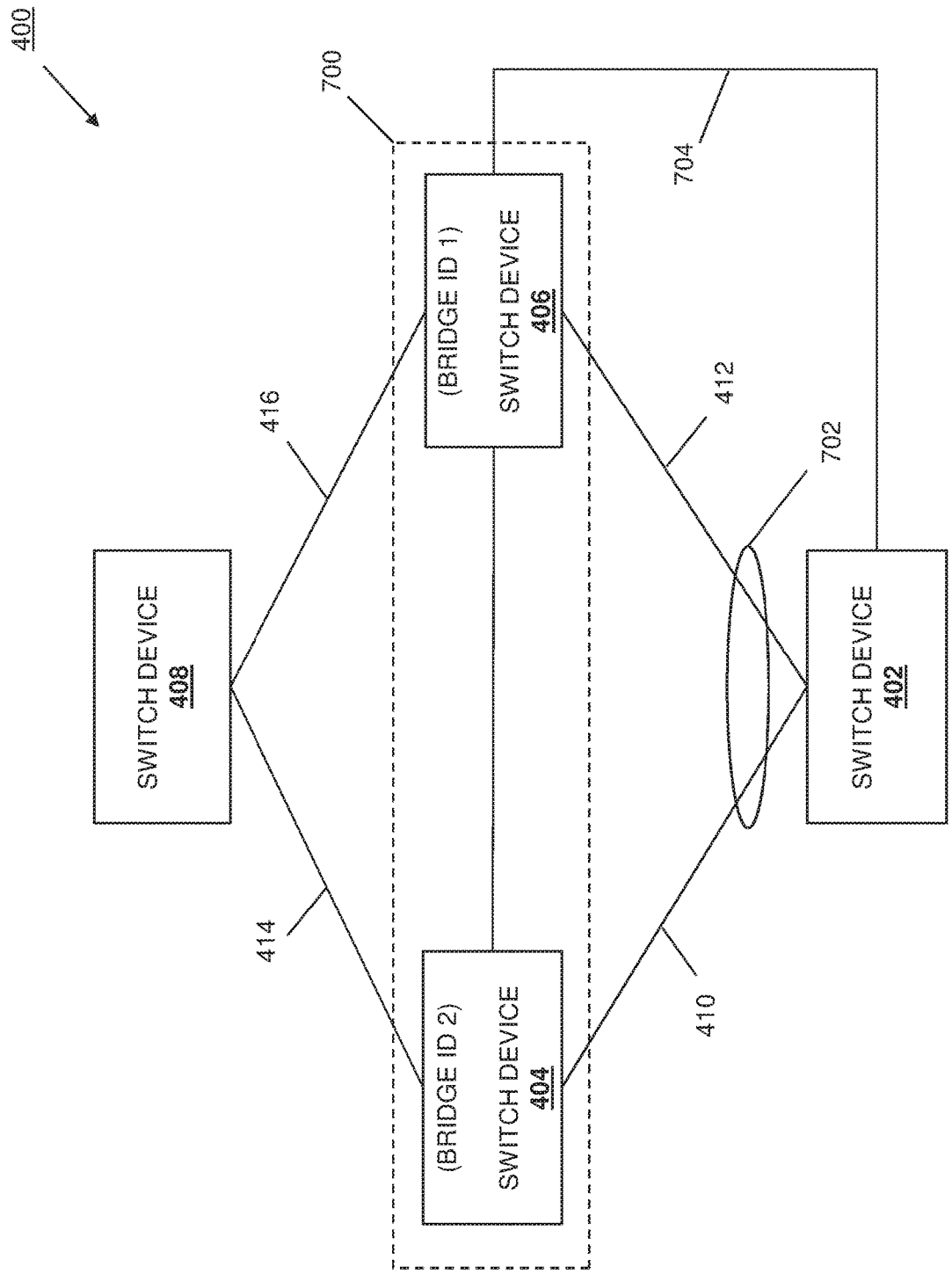

SPANNING TREE PROTOCOL BRIDGE-BASED LINK SELECTION SYSTEM

BACKGROUND

The present disclosure relates generally to information handling systems, and more particularly to selecting Spanning Tree Protocol (STP) links for communication between information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, sometime utilize the Spanning Tree Protocol (STP) for transmitting traffic through a network. As would be understood by one of skill in the art, the STP is a network protocol that builds a loop-free logical topology for Ethernet/Layer 2 (L2) networks, and operates to prevent bridge loops and the broadcast radiation that results from them, while allowing a network design that includes backup links that provide fault tolerance if an active link fails. The STP may be utilized to create a spanning tree within a network of connected layer-2 bridges (e.g., the switch devices discussed above), and disables those links that are not part of the spanning tree, leaving a single active link between any two network nodes. The active link provided between any two switch devices may be provided by a "designated port" on a "root/designated switch device" and a "root port" on a "non-root/non-designated switch device" (also referred to a "root-designated pair"), while the non-active links may be provided by a "designated port" on that root/designated switch device and an "alternate port" on that non-root/non-designated switch device (also referred to a "alternate-designated pair"). In many examples, one of the switch devices is selected as a root/designated switch device based on its root bridge identifier being lower than any of the other switch devices, and the active link for each non-root/non-designated switch device may be selected amongst a plurality of different links available between the directly connected root switch device or designated switch device and that non-root/non-designated switch device first based on relative root path costs, then based on the lowest designated bridge identifiers if the root path costs associated with the links are the same, and then based on the lowest designated port identifiers if the designated bridge identifiers associated with the links are the same. The use of the designated bridge identifiers in selecting the active link can raise a number of issues.

Typically, the use of the designated bridge identifiers in selecting the active link provides for the selection of the link provided by a port on the non-designated switch device that received the lowest designated bridge identifier from its directly connected designated switch device as the active link, and the designation of the remaining links provided by remaining ports on the non-designated switch device as non-active links (i.e., links that are blocked from forwarding data traffic.) However, subsequent to this STP active link selection, if a new link provided by a port on the non-designated switch device that is connected to a designated switch device having a lower designated bridge identifier becomes available, the active link selection process is repeated so that the new link may be selected as the active link (i.e., due to it being provided by the port on the non-designated switch device that received the lowest designated bridge identifier from its connected designated switch device.) As such, each time a new port on the non-designated switch device provides a new link to a directly connected designated switch device that becomes available and receives a designated bridge identifier that is lower than that received via the currently active link, the STP triggers a topology-change event and traffic is forced to reconverge on that new link due to its selection as the new active link.

The repeating of the STP active link selection process/reconvergence operations is associated with considerable overhead, including the performance of STP port re-selection operations, hardware port state re-programming, Media Access Control (MAC) address flushing, MAC address re-learning, and/or other STP tasks known in the art. Furthermore, the STP active link selection process/reconvergence operations can also result in traffic disruptions that can lead to data loss. Some conventional STP systems allow a network administrator or other user to fix the root switch device (e.g., via "Root Guard" enhancements available from CISCO® Systems, Inc. of San Jose, Calif., United States), but these mechanisms focus simply on "pinning" the root switch device, and do not provide any way to avoid the recomputations performed via the STP algorithms discussed above when several equal cost paths to a directly connected switch device are provided on available links and result in the reconvergence and traffic disruptions discussed above.

Accordingly, it would be desirable to provide an improved STP link selection system.

SUMMARY

According to one embodiment, an Information Handling System (IHS) includes a processing system; and a memory system that is coupled to the processing system and that includes instructions that, when executed by the processing system, cause the processing system to provide a Spanning Tree Protocol (STP) link selection engine that is configured to: receive, from a first designated switch device, a first communication that indicates that a first link provided to the first designated switch device is available and that identifies: a first root path cost; and a first designated switch device identifier; designate, in response to receiving the first communication, the first link as an active link; receive, from a second designated switch device subsequent to receiving the first communication, a second communication that indicates that a second link provided to the second designated switch device is available and that includes: a second root path cost that is equal to the first root path cost; and a second designated switch device identifier that is lower than the first designated switch device identifier; designate, in response to receiving the second communication, the second link as a non-active link; transmit, based on the designation of the first link as the active link, communications via the first link to the first designated switch device for transmittal to a root switch device; and block, based on the designation of the second link as the non-active link, communications via the second link to the second designated switch device.

BRIEF DESCRIPTION OF THE DRAWINGS

FIG. 7B is a schematic view illustrating an embodiment of the STP link selection system of FIG. 4 during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
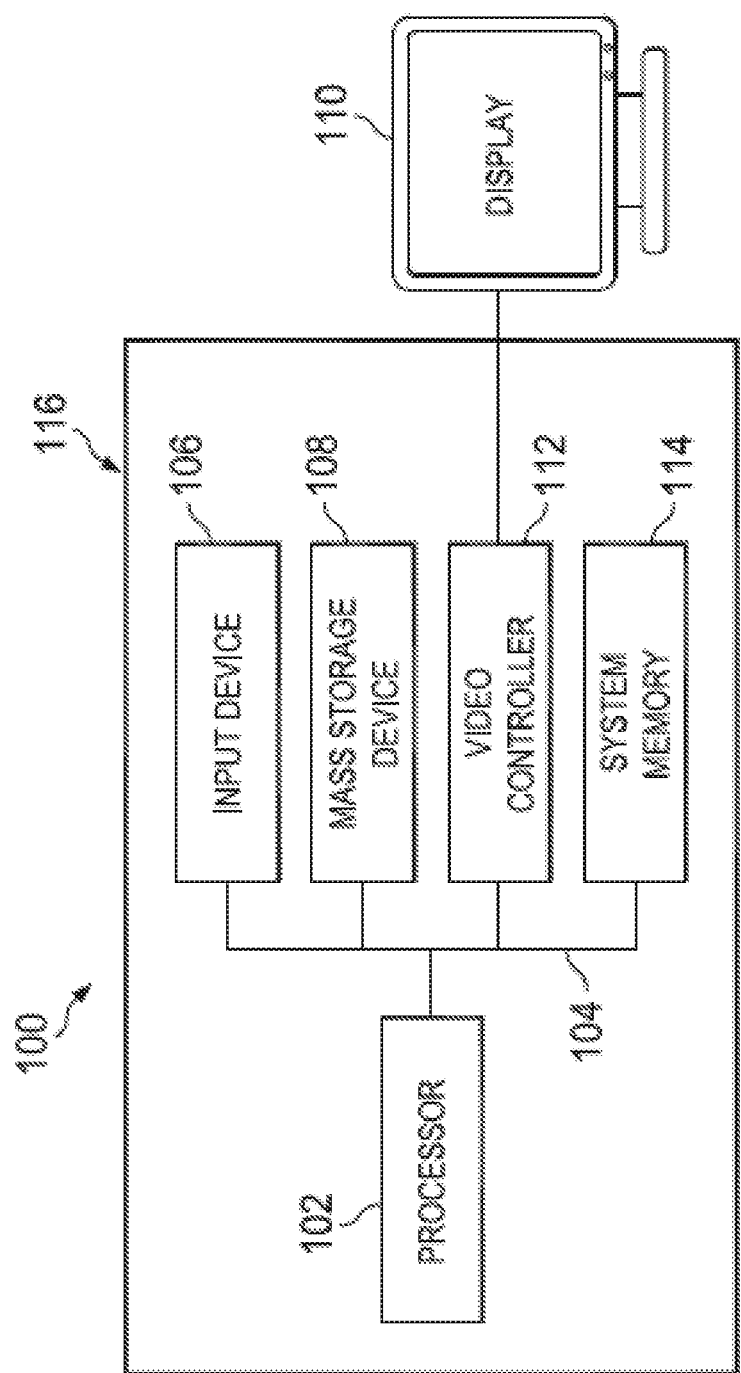
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
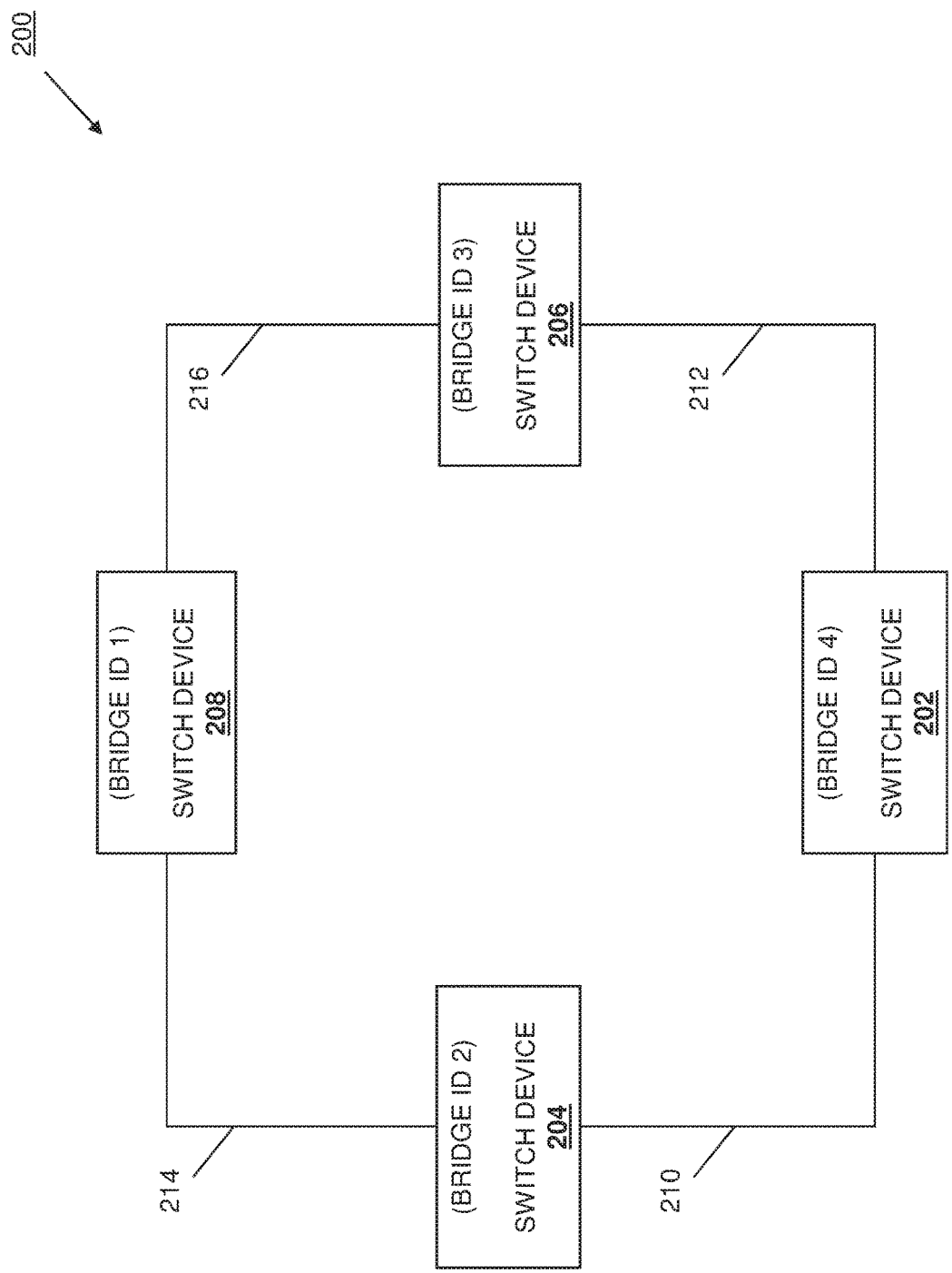
FIG. 2 is a schematic view illustrating an embodiment of an STP link selection system.

Referring now to FIG. 2, an embodiment of a Spanning Tree Protocol (STP) link selection system 200 is illustrated. In the illustrated embodiment, the STP link selection system 200 includes a plurality of switch devices 202, 204, 206, and 208. In an embodiment, any or all of the switch devices 202-208 may be provided by the IHS 100 discussed above with reference to FIG. 1, and/or may include some or all of the components of the IHS 100. However, while illustrated and discussed as switch devices, one of skill in the art in possession of the present disclosure will recognize that the switch devices provided in the STP link selection system 200 may be provided by other networking devices, and/or any devices that may be configured to operate similarly as discussed below.

In the examples discussed below, the switch device 208 includes a designated bridge identifier (e.g., "BRIDGE ID 1"), the switch device 206 includes a designated bridge identifier (e.g., "BRIDGE ID 3"), the switch device 204 includes a designated bridge identifier (e.g., "BRIDGE ID 2"), and the switch device 202 includes a designated bridge identifier (e.g., "BRIDGE ID 4"). Furthermore, in the examples below, the switch device 202 is connected to the switch device 204 by a connection 210 (e.g., an Ethernet cable connected to ports on the switch devices 202 and 204), the switch device 202 is connected to the switch device 206 by a connection 212 (e.g., an Ethernet cable connected to ports on the switch devices 202 and 206), the switch device 204 is connected to the switch device 208 by a connection 214 (e.g., an Ethernet cable connected to ports on the switch devices 204 and 208), and the switch device 206 is connected to the switch device 208 by a connection 216 (e.g., an Ethernet cable connected to ports on the switch devices 206 and 208). However, while only four switch devices are illustrated in FIG. 2, one of skill in the art in possession of the present disclosure will recognize that many more devices may (and typically will) be coupled together (e.g., in a datacenter) while remaining within the scope of the present disclosure. While a specific STP link selection system 200 has been illustrated and described, one of skill in the art in possession of the present disclosure will recognize that the STP link selection system of the present disclosure may include a variety of components and component configurations while remaining within the scope of the present disclosure as well.

Figure 3:
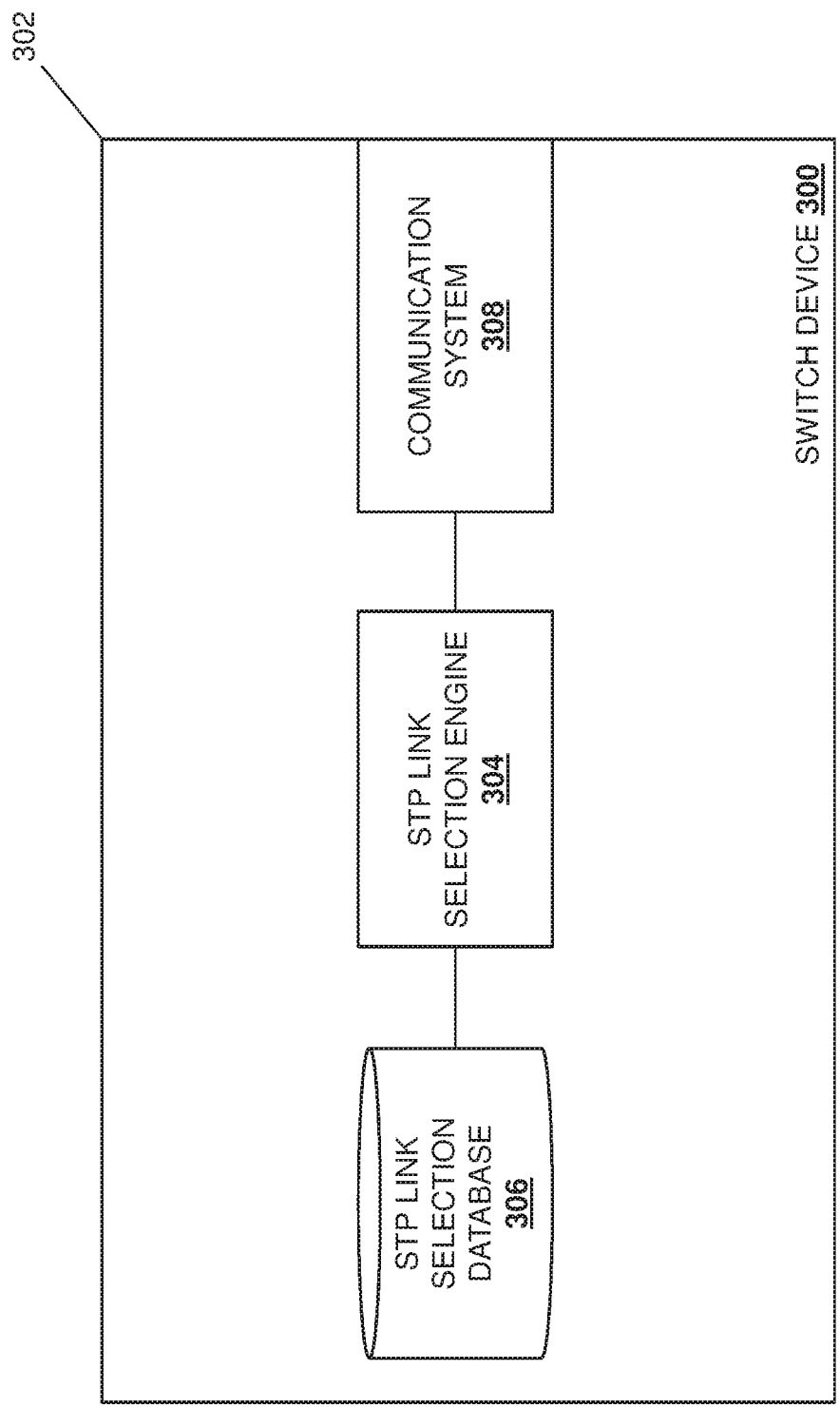
FIG. 3 is a schematic view illustrating an embodiment of a switch device that may be provided in the STP link selection system of FIG. 2.

Referring now to FIG. 3, an embodiment of a switch device 300 is illustrated that may provide any or all of the switch devices 202-208 discussed above with reference to FIG. 2. As such, the switch device 300 may be provided by the IHS 100 discussed above with reference to FIG. 1 and/or may include some or all of the components of the IHS 100. Furthermore, while illustrated and discussed as a switch device 300, one of skill in the art in possession of the present disclosure will recognize that the functionality of the switch device 300 discussed below may be provided by other networking devices and/or any other device configured to operate similarly as discussed below. In the illustrated embodiment, the switch device 300 includes a chassis 302 that houses the components of the switch device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a STP link selection engine 304 that is configured to perform the functionality of the STP link selection engines and/or switch devices discussed below. In a specific example, the functionality of the STP links selection engine 304 discussed below may be enabled via a configuration option in a Command Line Interface (CLI), allowing a user of the switch device 300 to enable and/or disable the functionality discussed below as needed.

The chassis 302 may also house a storage system (not illustrated, but which may include the storage 108 discussed above with reference to FIG. 1) that is coupled to the STP link selection engine 304 (e.g., via a coupling between the storage system and the processing system) and that includes an STP link selection database 306 that is configured to store any of the information utilized by the STP link selection engine 304 discussed below. The chassis 302 may also house a communication system 308 that is coupled to the STP link selection engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific switch device 300 has been illustrated, one of skill in the art in possession of the present disclosure will recognize that switch devices (or other networking devices and/or other devices operating according to the teachings of the present disclosure in a manner similar to that described below for the switch device 300) may include a variety of components and/or component configurations for providing conventional switch device functionality, as well as the functionality discussed below, while remaining within the scope of the present disclosure as well.

Figure 4:
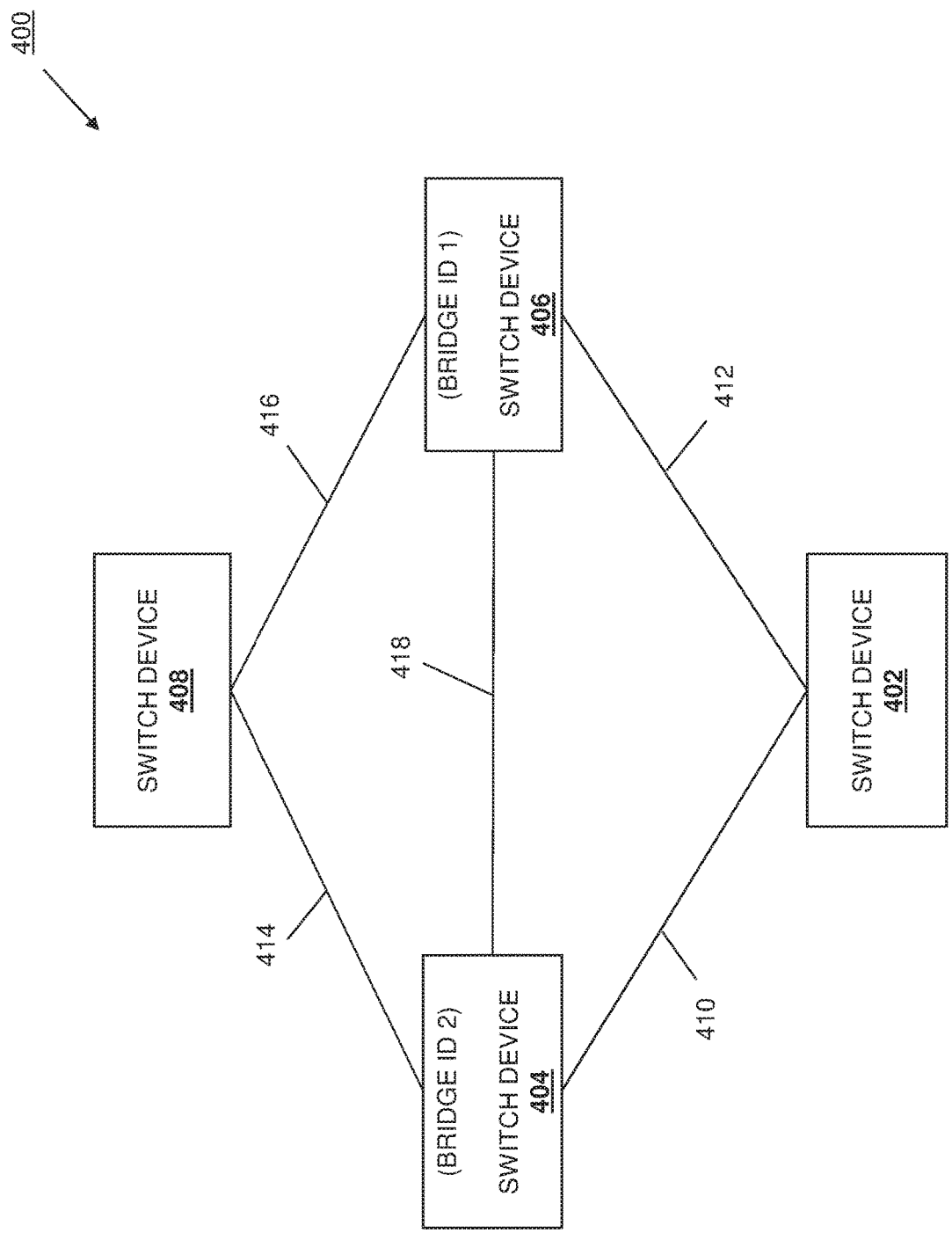
FIG. 4 is a schematic view illustrating an embodiment of an STP link selection system.

Referring now to FIG. 4, an embodiment of an STP link selection system 400 is illustrated. In the illustrated embodiment, the STP link selection system 400 incudes a plurality of switch devices 402, 404, 406, and 408. In an embodiment, any or all of the switch devices 402-408 may be provided by the IHS 100 discussed above with reference to FIG. 1, and/or may include some or all of the components of the IHS 100. In specific examples discussed below, any or all of the switch devices 402-408 may be provided by the switch device 300 discussed above with reference to FIG. 3. However, while illustrated and discussed as switch devices, one of skill in the art in possession of the present disclosure will recognize that the switch devices provided in the STP link selection system 400 may be provided by other networking devices, and/or any devices that may be configured to operate similarly as discussed below.

In the examples discussed below, the switch device 406 includes a designated bridge identifier (e.g., "BRIDGE ID 1"), and the switch device 404 includes a designated bridge identifier (e.g., "BRIDGE ID 2"). Similarly to the STP link selection system 200 of FIG. 2, in the examples below, the switch device 402 is connected to the switch device 404 by a connection 410 (e.g., an Ethernet cable connected to ports on the switch devices 402 and 404), the switch device 402 is connected to the switch device 406 by a connection 412 (e.g., an Ethernet cable connected to ports on the switch devices 402 and 406), the switch device 404 is connected to the switch device 408 by a connection 414 (e.g., an Ethernet cable connected to ports on the switch devices 404 and 408), and the switch device 406 is connected to the switch device 408 by a connection 416 (e.g., an Ethernet cable connected to ports on the switch devices 406 and 408). In addition, the switch device 404 is connected to the switch device 406 by a connection 418, which may provide an Inter-Chassis Link (ICL) between the switch devices 404 and 406 when those switch devices are aggregated to provide an aggregated switch device as discussed below. However, while only four switch devices are illustrated in FIG. 4, one of skill in the art in possession of the present disclosure will recognize that many more devices may (and typically will) be coupled together (e.g., in a datacenter) while remaining within the scope of the present disclosure. While a specific STP link selection system 400 has been illustrated and described, one of skill in the art in possession of the present disclosure will recognize that the STP link selection system of the present disclosure may include a variety of components and component configurations while remaining within the scope of the present disclosure as well.

Figure 5:
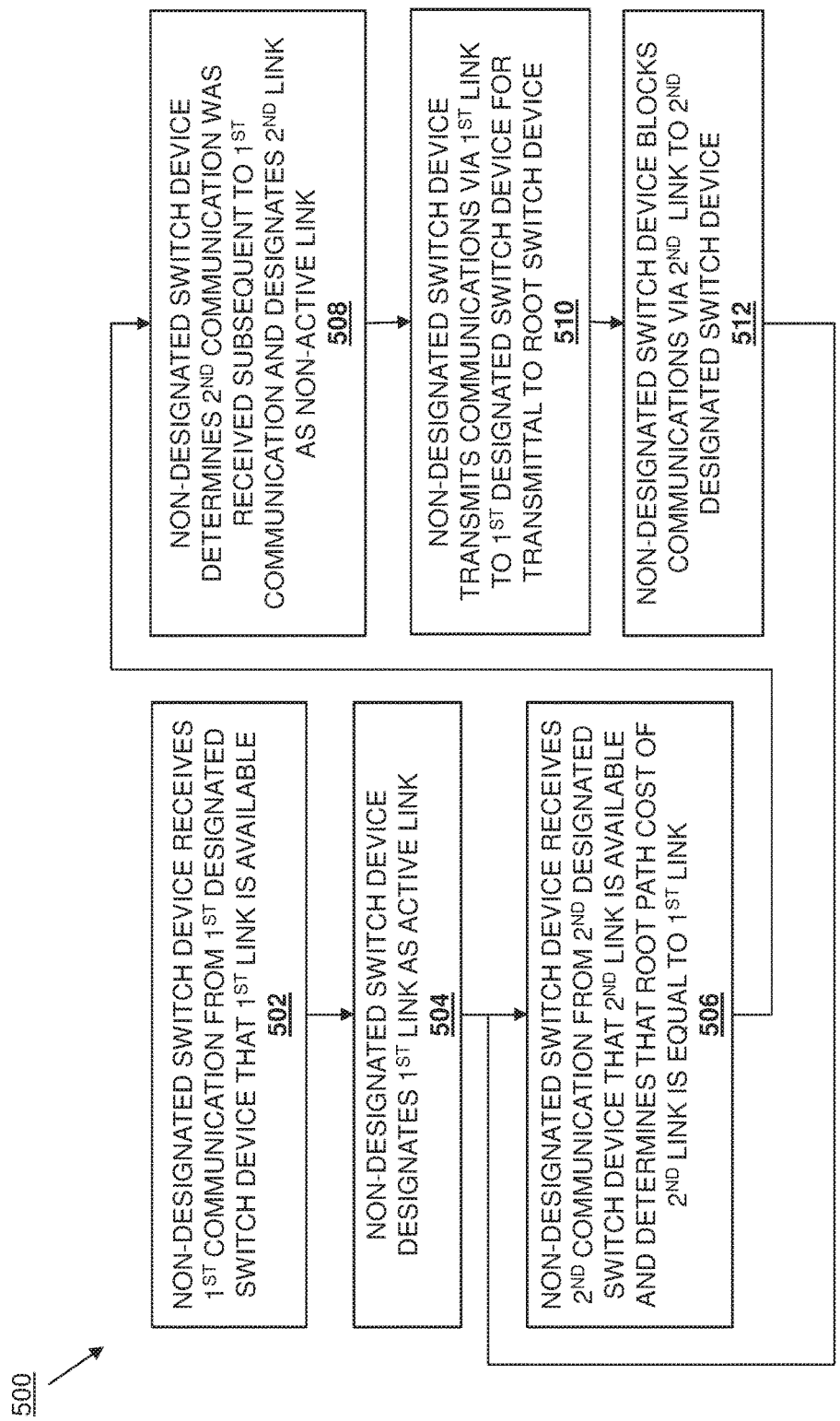
FIG. 5 is a flow chart illustrating an embodiment of a method for selecting STP links.

Referring now to FIG. 5, an embodiment of a method for selecting STP links is illustrated. As discussed below, the systems and methods of the present disclosure provide for the continued use of an active link provided via a first port that has received a first designated bridge identifier when a second port provides a subsequent link that has the same root path cost as the active link and that second port receives a second designated bridge identifier that is lower than the first designated bridge identifier. As such, the subsequent availability of the second link associated with the lower designated bridge identifier following the use of the active link does not cause the repeating of the active link selection process that would conventionally cause the second link to be selected as the new active link, preventing the triggering of a topology-change event that forces traffic to reconverge on that new active link and reducing the processing overhead and possible data losses that occur in conventional STP link selection systems. As will be appreciated by one of skill in the art in possession of the present disclosure, the discussion of the teachings of the present disclosure with respect to the STP may be applied to a variety of STP types, including the Rapid Per-VLAN Spanning Tree (RPVST) protocol, the Rapid STP (RSTP), the Multiple STP (MSTP), and/or other STP types known in the art.

The method 500 begins at block 502 where a non-designated switch device receives a first communication from a first designated switch device that indicates that a first link to the first designated switch device is available. In an embodiment, at block 502, the switch devices included in the STP link selection system 200 and/or 400 may be powered on, started up, reset, booted, and/or otherwise initialized. With reference to the STP link selection system 200 of FIG. 2, as part of the initialization, the switch devices 202, 204, 206, and/or 208 may communicate in order to establish links on the connections 210, 212, 214, and/or 216 between them. Similarly, with reference to the STP link selection system 400 of FIG. 4, as part of the initialization, the switch devices 402, 404, 406, and/or 408 may communicate in order to establish links and/or Link Aggregation Groups (LAGs) on the connections 410, 412, 414, and/or 416 between them. The details of the establishment of links and LAGs between switch devices would be apparent to one of skill in the art in possession of the present disclosure, and thus are not described herein in detail.

Figure 6A:
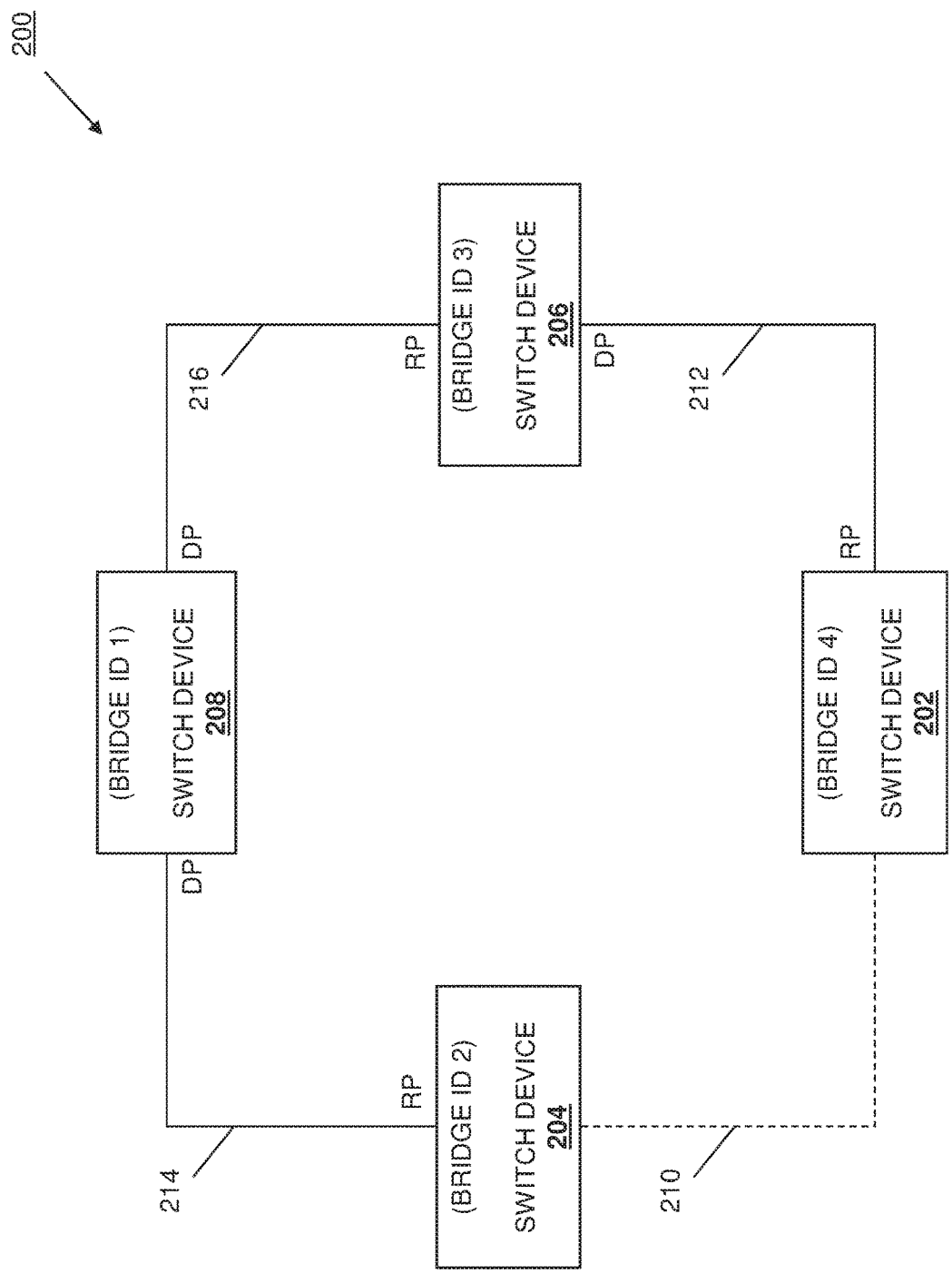
FIG. 6A is a schematic view illustrating an embodiment of the STP link selection system of FIG. 2 during the method of FIG. 5.

With reference to FIG. 6A, an example is illustrated in which the switch device 208 has been elected as a root switch device (hereinafter the "root switch device 208"), with each of the switch devices 204 and 206 provided as designated switch devices (hereinafter the "designated switch devices 204 and 206"). For example, a switch device may be selected as a root switch device (also called a "root bridge") based on that switch device having the lowest root switch device/bridge identifier (e.g., a root bridge identifier that is lower than a root bridge identifiers for the remaining switch devices), or may be designated as a designated switch device when another switch device has been elected as the root switch device. As a root bridge is a designated bridge, one of skill in the art in possession of the present disclosure will recognize that switch devices may be referred to as "designated switch devices" with the understanding that they may operate as either a root bridge or a designated bridge. As part of the selection of the switch device 208 as the root switch device and the operation of the switch devices 204 as a designated switch device, an available link provided on the connection 214 between the root switch device 208 and the designated switch device 204 may include a port on the root switch device 208 operating as a designated port ("DP"), and a port on the designated switch device 204 operating as a root port ("RP"), and may provide a first path to the root switch device 208 via the designated switch device 204. Similarly, as part of the selection of the switch device 208 as the root switch device and the operation of the switch devices 206 as a designated switch device, an available link provided on the connection 216 between the root switch device 208 and the designated switch device 206 may include a port on the root switch device 208 operating as a designated port ("DP"), and a port on the designated switch device 206 operating as a root port ("RP"), and may provide a second path to the root switch device 208 via the designated switch device 206.

At block 502, a first link on the connection 212 between the designated switch device 206 and the switch device 202 may become available, causing the switch device 202 to operate as a non-designated switch device (hereinafter the "non-designated switch device 202", which one of skill in the art in possession of the present disclosure will recognize may include non-root switch devices). As such, as block 502, the STP link selection engine 304 in the non-designated switch device 202/300 may receive a communication via its communication system 308 from the designated switch device 206 that indicates that the first link provided on the connection 212 to the designated switch device 206 is available. In an embodiment, the communication received by the non-designated switch device 202 at block 502 may include a Bridge Protocol Data Unit (BPDU) communication that identifies, for example, a root path cost associated with the first link (e.g., "500" in the examples below), the designated bridge identifier of the designated switch device 206 (e.g., "BRIDGE ID 3"), a port identifier for the port on the designated switch device 206 that provides the first link, and/or other BPDU information that would be apparent to one of skill in the art in possession of the present disclosure. However, while a specific communication protocol and specific information provided therein has been discussed, one of skill in the art in possession of the present disclosure will recognize that other communication protocols and associated information may be utilized while remaining within the scope of the present disclosure as well. In some embodiments, the STP link selection engine 304 in the non-designated switch device 202/300 may provide some indication in its STP link selection database 306 that the communication received from the designated switch device 206 (e.g., the BPDU communication) at block 502 was the first communication received for an available link that provides access for the non-designated switch device 202 to the root switch device 208.

Figure 7A:
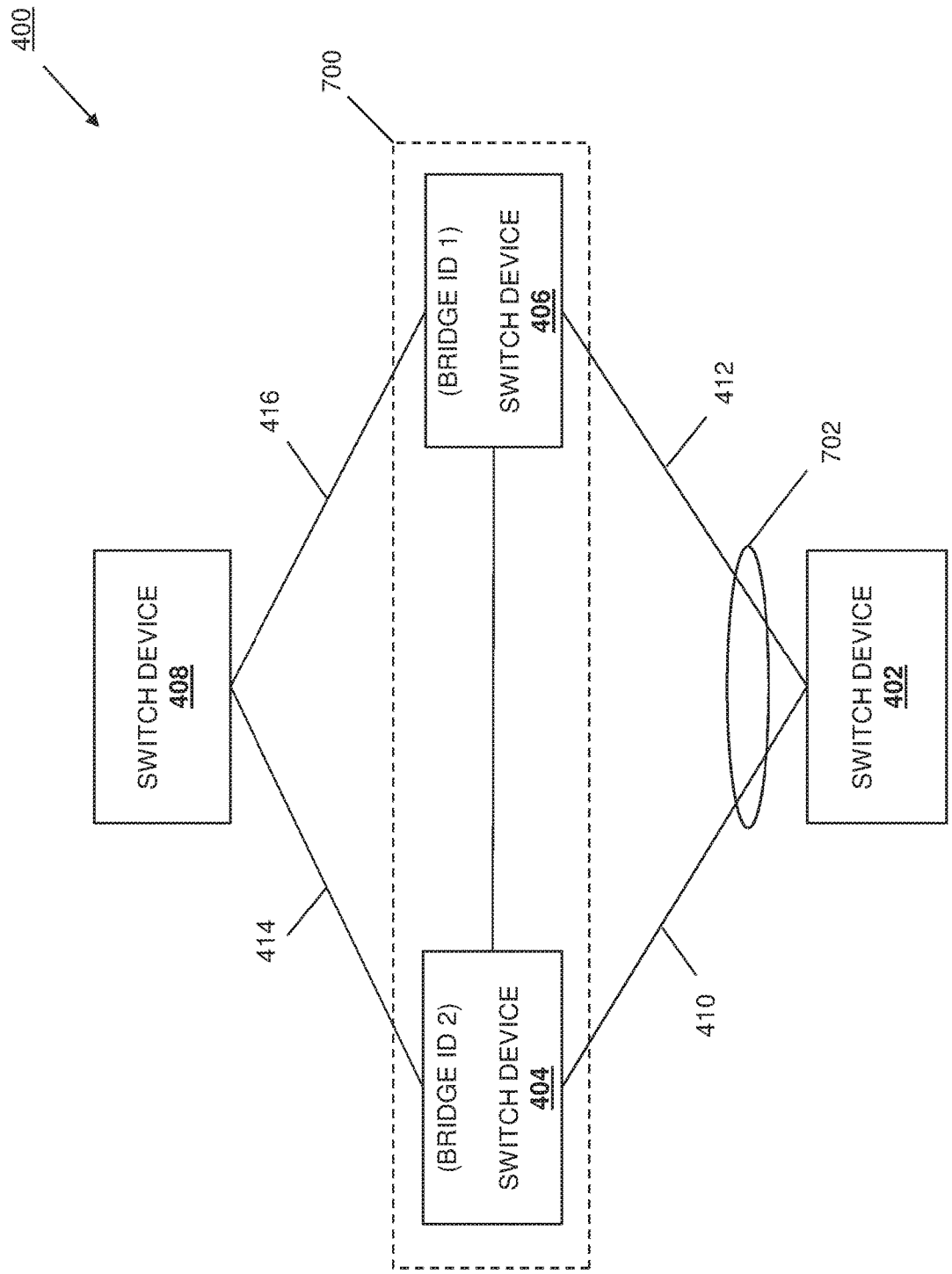
FIG. 7A is a schematic view illustrating an embodiment of the STP link selection system of FIG. 4 during the method of FIG. 5.

With reference to FIG. 7A, an example is illustrated in which the switch devices 404 and 406 have been aggregated to provide an aggregated switch device 700, with the links provided on the connections 410 and 412 between the switch device 402 and the switch devices 404 and 406, respectively, aggregated to provide a Link Aggregation Group (LAG) 702. In the examples discussed below, the switch device 404 may operate as a primary switch device in the aggregated switch device 700, and the switch device 406 may operate as a secondary switch device in the aggregated switch device 700. In a specific example, the aggregated switch device 700 and the LAG 702 may be provided using Virtual Link Trunking (VLT), which one of skill in the art in possession of the present disclosure will recognize is a proprietary aggregation protocol available from DELL® Inc. of Round Rock, Tex., United States. However, one of skill in the art in possession of the present disclosure will recognize that other aggregation protocols will fall within the scope of the present disclosure as well. As such, in this specific example, the aggregated switch device 700 is a VLT device provided by the switch device 404 acting as a VLT primary device and the switch device 406 acting as a VLT secondary device, and the LAG 702 is a VLT LAG provided between the switch device 402 and the aggregated switch device 700/VLT device. As discussed below, the aggregated switch device/VLT device may utilize the designated bridge identifier of the switch device 404/primary VLT device when communicating with directly connected switch devices. As will be recognized by one of skill in the art in possession of the present disclosure, the STP may be enabled on VLT links to avoid loops that may occur due to link unavailability (described further below), and thus the use aggregated switches, LAGs, and their VLT equivalents provides a failure-scenario loop prevention technique rather than a primary loop prevention technique, as the VLT protocol prevents links without the need for the STP.

As such, at block 502, a LAG 702 provided by the links on the connections 410 and 412 between the aggregated switch device 700 and the switch device 202 may become available, and the STP link selection engine 304 in the switch device 402/300 may receive a communication via its communication system 308 from the aggregated switch device 700 that indicates that the LAG 702 provided by the links on the connections 410 and 412 to the aggregated switch device 700 is available. In an embodiment, the communication received by the switch device 402 at block 502 may include a Bridge Protocol Data Unit (BPDU) communication that identifies, for example, a root path cost associated with the LAG 702 (e.g., "500" in the example below), the designated bridge identifier of the aggregated switch device 700 (e.g., the designated bridge identifier for the switch device 404/VLT primary device "BRIDGE ID 2"), a port channel identifier for the port channel that provides the LAG 702, and/or other BPDU information that would be apparent to one of skill in the art in possession of the present disclosure. However, while a specific communication protocol and specific information provided therein has been discussed, one of skill in the art in possession of the present disclosure will recognize that other communication protocols and associated information may be utilized while remaining within the scope of the present disclosure as well. In some embodiments, the STP link selection engine 304 in the switch device 402/300 may provide some indication in its STP link selection database 306 that the communication from the aggregated switch device 700 (e.g., the BPDU communication) at block 502 was the first communication received for an available link/LAG to the switch device 408.

The method 500 then proceeds to block 504 where the non-designated switch device designates the first link as an active link. Continuing with the example above with reference to the STP link selection system 200 illustrated in FIG. 6A, the first link provided by the connection 212 between the non-designated switch device 202 and the designated switch device 206 is the only available link for the non-designated switch device 202 to the root switch device 208 (as illustrated by the dashed line provided on the connection 210 that is indicative of an unavailable link in this example) and, as such, the STP link selection engine 304 in the non-designated switch device 202 may designate the first link as an active link (e.g., with the port on the designated switch device 206 that provides the first link operating as a designated port ("DP") and the port on the non-designated switch device 202 that provides the first link operating as a root port ("RP").) Similarly, continuing with the example above with reference to the STP link selection system 400 illustrated in FIG. 7A, the LAG 702 provided by the links on the connections 410 and 412 between the switch device 402 and the aggregated switch device 700 is the only available link/LAG for the non-designated switch device 202 to the switch device 408 and, as such, the STP link selection engine 304 in the switch device 402 may designate the LAG 702 as an active link/LAG.

Figure 6B:
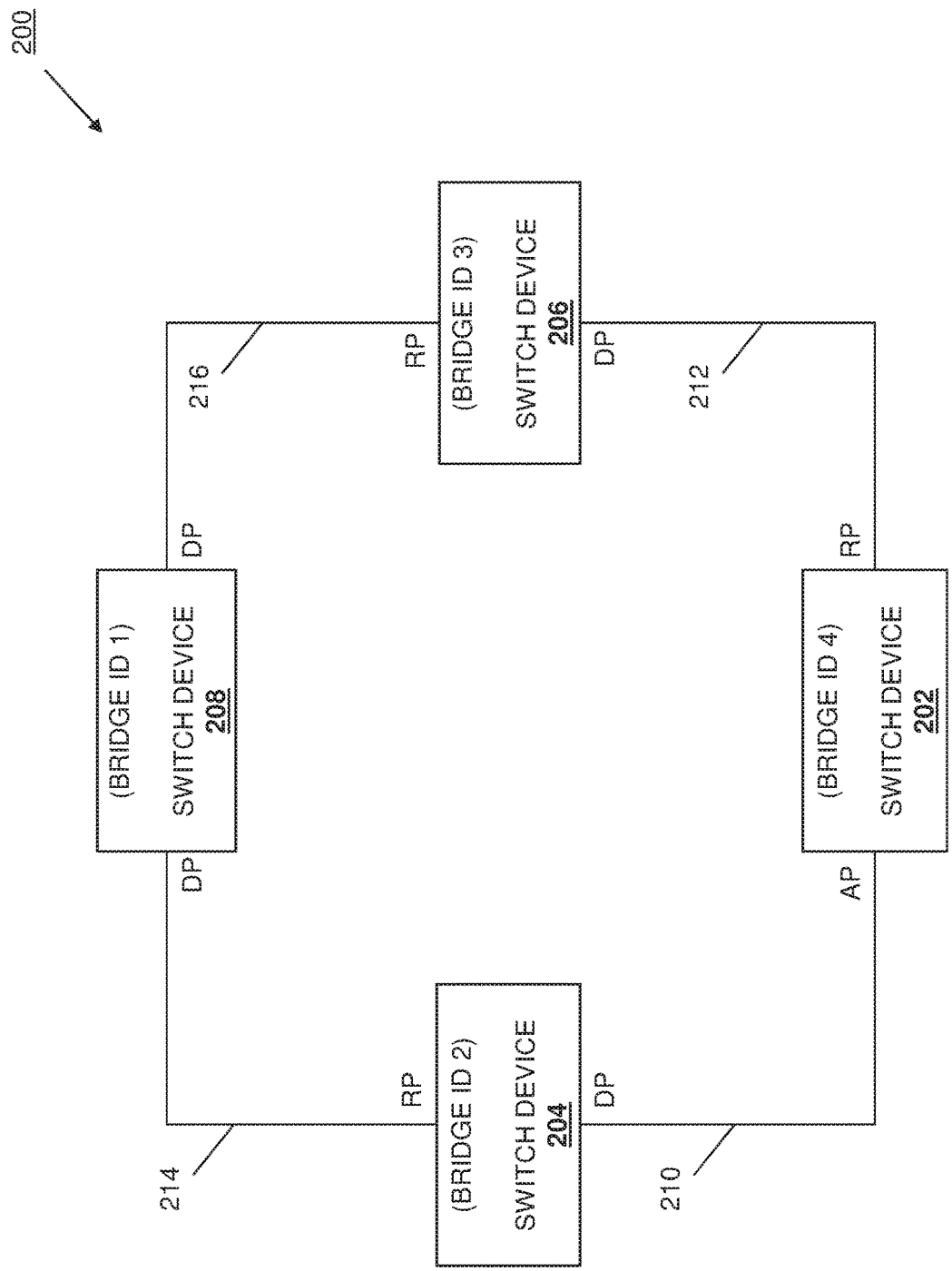
FIG. 6B is a schematic view illustrating an embodiment of the STP link selection system of FIG. 2 during the method of FIG. 5.
Figure 6C:
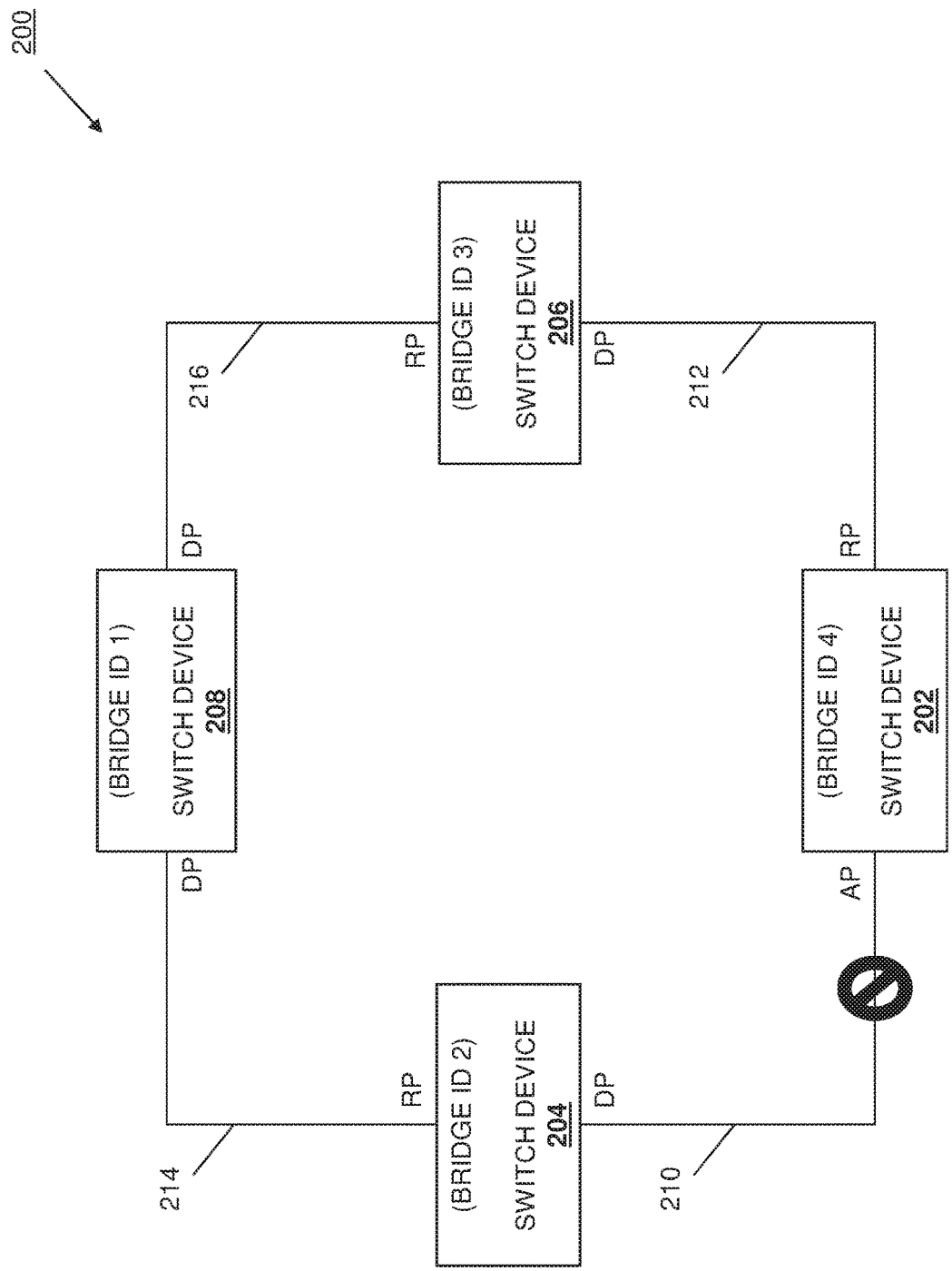
FIG. 6C is a schematic view illustrating an embodiment of the STP link selection system of FIG. 2 during the method of FIG. 5.

The method 500 then proceeds to block 506 where the non-designated switch device receives a second communication from a second designated switch device that indicates that a second link to the second designated switch device is available, and determines that a root path cost of the second link is equal to a root path cost of the first link. Continuing with the example above with reference to the STP link selection system 200, at block 506, a second link on the connection 210 between the designated switch device 204 and the non-designated switch device 202 may become available. With reference to FIG. 6B, at block 506, the STP link selection engine 304 in the non-designated switch device 202/300 may receive a communication via its communication system 308 from the designated switch device 204 that indicates that the second link provided on the connection 210 to the designated switch device 204 is available (as illustrated by the solid line provided on the connection 210 that is indicative of an available link in this example), and the STP link selection engine 304 in the non-designated switch device 202/300 will perform STP link selection operations to determine the best path to the root switch device 208. In an embodiment, the communication received by the non-designated switch device 202 at block 506 may include a BPDU communication that identifies, for example, a root path cost associated with the second link (e.g., "500" in this example), the designated bridge identifier of the designated switch device 204 (e.g., "BRIDGE ID 2"), a port identifier for the port on the designated switch device 204 that provides the second link, and/or other BPDU information that would be apparent to one of skill in the art in possession of the present disclosure. However, while a specific communication protocol and specific information provided therein has been discussed, one of skill in the art in possession of the present disclosure will recognize that other communication protocols and associated information may be utilized while remaining within the scope of the present disclosure as well.

As discussed above, STP link selection operations may include selecting amongst available links that provide access to the root switch device 208 for the non-designated switch device 202, first based on relative root path costs of the available links, then using a "lowest designated bridge identifier" tiebreaker that is based on the designated bridge identifiers associated with the available links if the root path costs associated with the available links are the same, and then using a "lowest designated port identifier" tiebreaker that is based on the designated port identifiers that provide the available links if the designated bridge identifiers associated with the available links are the same. In this example, the root path costs of the first link provided on the connection 212 and the second link provided on the second connection 210 are the same (e.g., each of the first link and the second link has a root path cost of "500" in this example) and, as discussed above, conventional STP link selection operations would utilize the lower of the designated bridge identifier received from the designated switch device 206 on the first link provided on the connection 212 (e.g., "BRIDGE ID 3" in this example), and the designated bridge identifier received from the designated switch device 204 on the second link provided on the connection 210 (e.g., "BRIDGE ID 3" in this example), to select the active link. As such, in this example in which the root path costs for the first link and the second link are the same, conventional STP link selection systems would require the designation of the second link provided on the connection 210 as the active link, resulting in the triggering of a topology-change event that forces traffic to reconverge on that new active link, and that is associated with processing overhead and possible data losses.

Continuing with the example above with reference to the STP link selection system 400 and with reference to FIG.

7B, a connection 704 between the switch device 406 and the switch device 402 may be provided, and a link may become available on that connection 704. As such, as block 506, the STP link selection engine 304 in the switch device 402/300 may receive a communication via its communication system 308 from the switch device 406 that indicates that the link provided on the connection 704 to the switch device 406 is available, and the STP link selection engine 304 in the switch device 402/300 will perform STP link selection operations to determine the best path to the switch device 408. In an embodiment, the communication received by the switch device 402 at block 506 may include a BPDU communication that identifies, for example, a root path cost associated with the link provided on the connection 704 (e.g., "1000" in this example), the designated bridge identifier of the switch device 406 (e.g., "BRIDGE ID 1"), a port identifier for the port on the designated switch device 406 that provides the link provided on the connection 704, and/or other BPDU information that would be apparent to one of skill in the art in possession of the present disclosure. However, while a specific communication protocol and specific information provided therein has been discussed, one of skill in the art in possession of the present disclosure will recognize that other communication protocols and associated information may be utilized while remaining within the scope of the present disclosure as well.

Figure 7C:
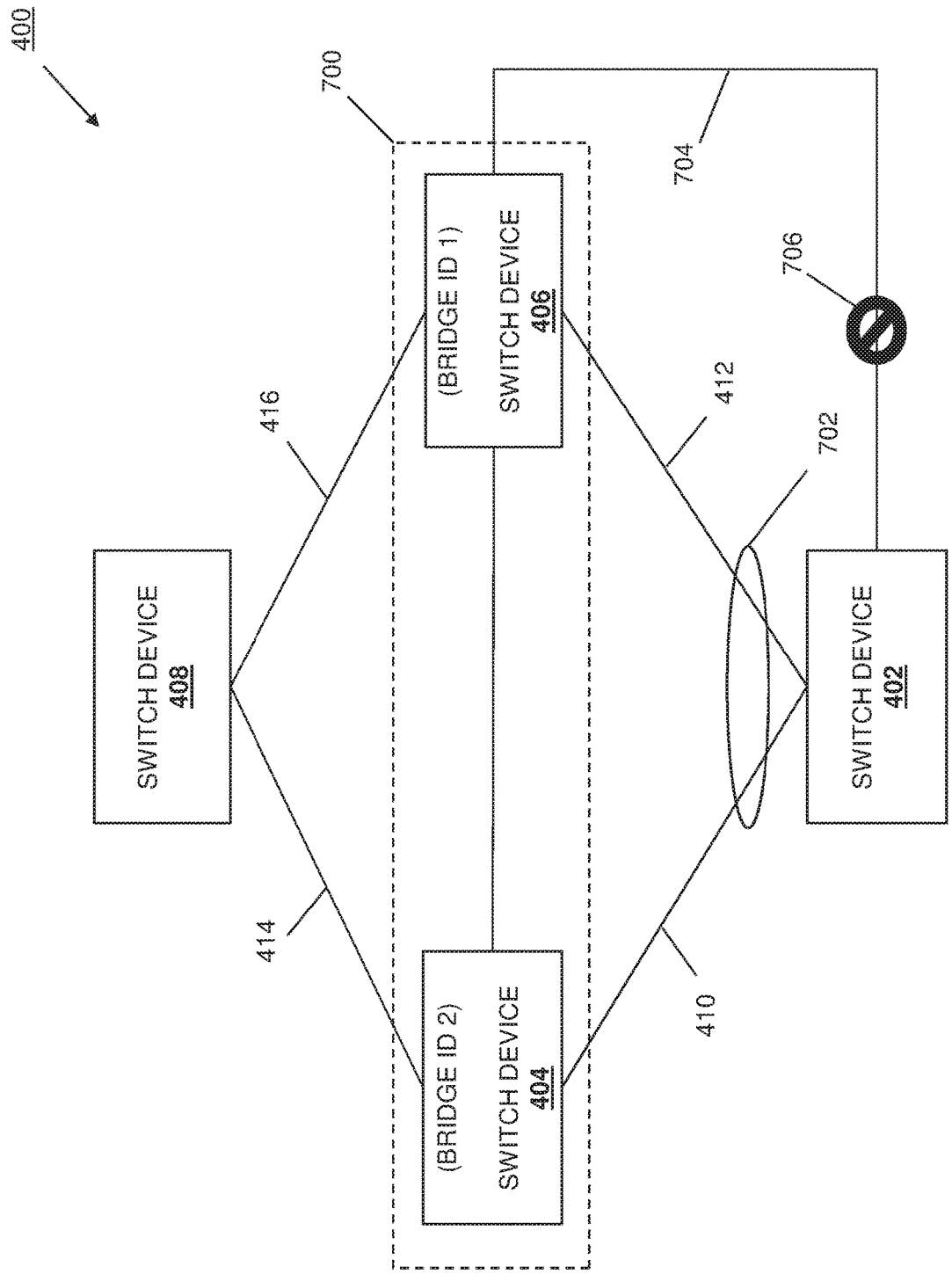
FIG. 7C is a schematic view illustrating an embodiment of the STP link selection system of FIG. 4 during the method of FIG. 5.

As discussed above, STP link selection operations may include selecting amongst links available between the switch device 408 and the switch device 402, first based on relative root path costs of the available links, then using a "lowest designated bridge identifier" tiebreaker that is based on the designated bridge identifiers associated with the available links if the root path costs associated with the available links are the same, and then using a "lowest designated port identifier" tiebreaker that is based on the designated port identifiers that provide the available links if the designated bridge identifiers associated with the available links are the same. In this example, the root path cost of the LAG 702 provided on the connections 410 and 412 (e.g., "500") is lower than the root path cost of the link provided on the connection 704 (e.g., "1000" in this example) and, as discussed above, the STP link selection engine 304 in the switch device 402/300 will then select the LAG 702 as the active link/LAG (i.e., because it has a lower root path cost than the link provided on the connection 704), and operate to block the link provided on the connection 704 (as indicated by the element 706 in FIG. 7C.)

Figure 7D:
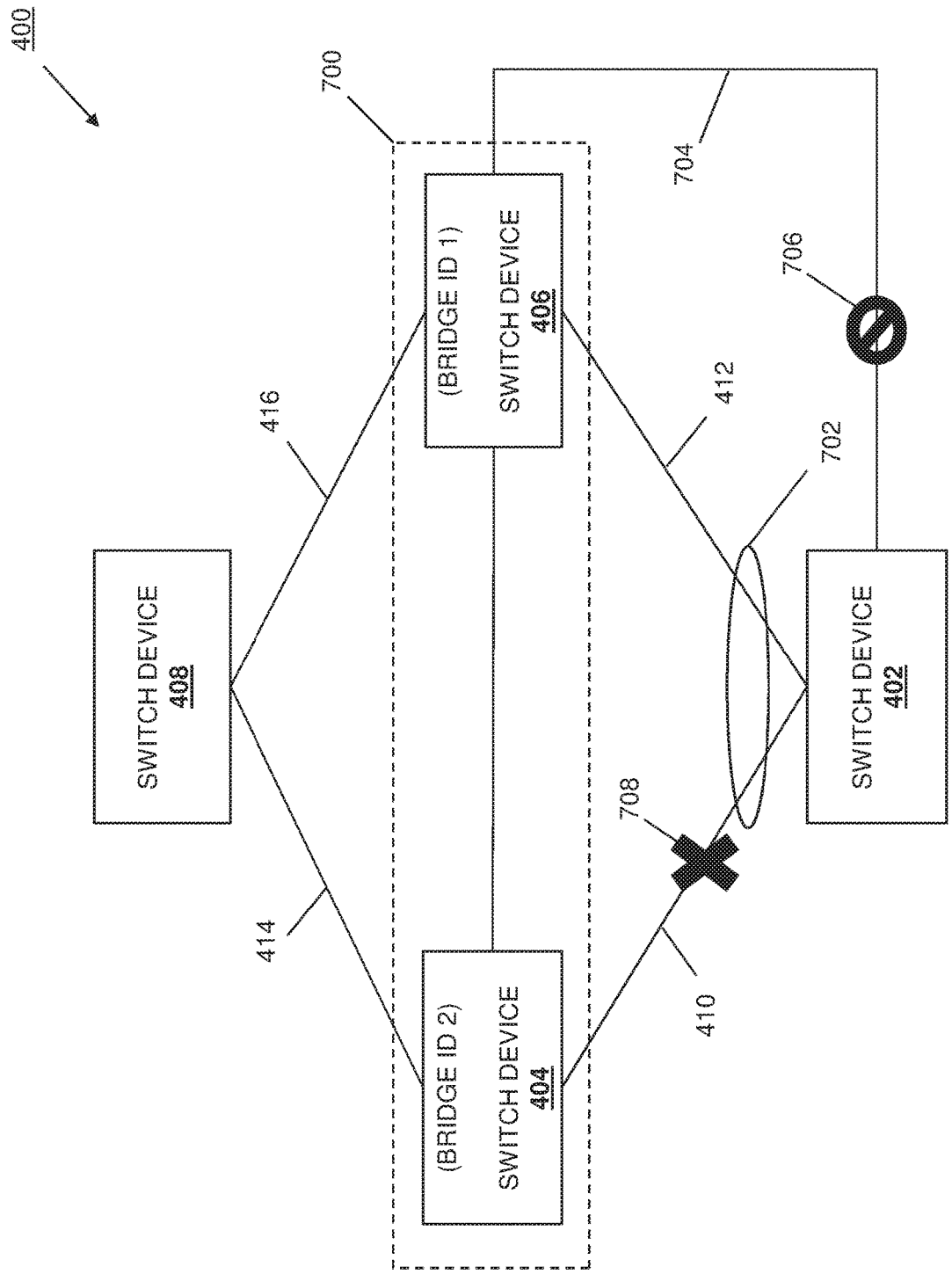
FIG. 7D is a schematic view illustrating an embodiment of the STP link selection system of FIG. 4 during the method of FIG. 5.

However, following the selection of the LAG 702 as the active link/LAG, the link provided on the connection 410 between the switch devices 402 and 404 may become fail, "go down", or otherwise become unavailable (as illustrated by the element 708 in FIG. 7D.) As would be understood by one of skill in the art in possession of the present disclosure, the unavailability of the link provided on the connection 410 as part of the LAG 700 will increase the root path cost of the LAG 702 (which now only includes the link provided on the connection 412 between the switch devices 402 and 406). In this example, the root path cost of the LAG 702 provided on the connection 412 may increase (e.g., to "1000") such that it is the same as the root path cost of the link provided on the connection 704 (e.g., which is "1000" in this example) and, as discussed above, conventional STP link selection operations would utilize the lower of the designated bridge identifier received from the aggregated switch device 700 (e.g., the designated bridge identifier for the switch device 404/VLT primary device "BRIDGE ID 2"), and the designated bridge identifier received from the switch device 406 on the link provided on the connection 704 (e.g., "BRIDGE ID 1" in this example), to select the active link. As such, in this example in which the root path costs for the LAG 702 and the link provided on the connection 704 are the same, conventional STP link selection systems would require the designation of the link provided on the connection 704 as the active link, resulting in the triggering of a topology-change event that forces traffic to reconverge on that new active link, and that is associated with processing overhead and possible data losses.

The method 500 then proceeds to block 508 where the non-designated switch device determines that the second communication was received subsequent to the first communication and designates the second link as a non-active link. Continuing with the example above with reference to the STP link selection system 200, at block 508, the STP link selection engine 304 in the switch device 202/300 may determine that the second communication received on the second link provided on the connection 210 at block 506 was received subsequent to the first communication received on the first link provided on the connection 212 at block 502 and, in response, designate the second link as a non-active link. For example, at block 508, the STP link selection engine 304 in the switch device 202/300 may access the STP link selection database 306 and identify the indication that the first communication from the designated switch device 206 (e.g., the BPDU communication) was the first communication received for an available link that provides access for the non-designated switch device 202 to the root switch device 208 and, in response, designate the second link provided on the connection 210 as a non-active link that includes a port on the designated switch device 204 operating as a designated port ("DP"), and a port on the non-designated switch device 202 operating as an alternate port ("AP").

In some examples, at block 508 and in response to determining that the root path cost of the link provided on the connection 210 is equal to the root path cost of the link provided on the connection 212, the STP link selection engine 304 in the switch device 202/300 may detect an instruction to designate the link provided on the connection 210 as the active link, and to designate the link provided on the connection 212 as the non-active link, based on the designated bridge identifier of the switch device 204 being lower than the designated bridge identifier of the switch device 206 (i.e., a conventional STP instruction in such a situation.) In response to receiving that instruction, the STP link selection engine 304 in the switch device 202/300 may override that instruction in order to designate the link provided on the connection 210 as the non-active link and keep the link provided on the connection 212 designated as the active link.

Continuing with the example above with reference to the STP link selection system 400, at block 508, the STP link selection engine 304 in the switch device 402/300 may determine that the second communication received on the link provided on the connection 704 at block 506 was received subsequent to the first communication received on the LAG 702 that was provided on the connections 410 and 412 at block 502 (and that is now only provided on the connection 412 in this example) and, in response, designate the link provided on the connection 704 as a non-active link. For example, at block 508, the STP link selection engine 304 in the switch device 402/300 may access the STP link selection database 306 and identify the indication that the first communication from the aggregated switch device 700 (e.g., the BPDU communication) was the first communication received for an available link that provides access for the switch device 402 to the switch device 408 and, in response, designate the link provided on the connection 704 as a non-active link.

In some examples, at block 508 and in response to determining that the root path cost of the link provided on the connection 704 is equal to the root path cost of the LAG 702 that is now only provided on the connection 412, the STP link selection engine 304 in the switch device 402/300 may detect an instruction to designate the link provided on the connection 704 as the active link, and to designate the LAG 702 that is now only provided on the connection 412 as the non-active link, based on the designated bridge identifier of the switch device 406 being lower than the designated bridge identifier of the aggregated switch device 700, which as discussed above may be the designated bridge identifier of the switch device 404/VLT primary device (i.e., a conventional STP instruction in such a situation.) In response to receiving that instruction, the STP link selection engine 304 in the switch device 402/300 may override that instruction in order to designate the link that is provided on the connection 704 as the non-active link and keep the LAG that is only provided on the connection 412 designated as the active link/LAG.

The method 500 then proceeds to block 510 where the non-designated switch device transmits communications via the first link that was designated as the active link to the first designated switch device for transmittal to the root switch device, and to block 512 where the non-designated switch device blocks communications via the second link that was designated as the non-active link to the second designated switch device. With reference to the STP link selection system 200, at blocks 510 and 512, the STP link selection engine 304 in the non-designated switch device 202 may operate to transmit communications via the first link provided on the connection 212 to the designated switch device 206 (i.e., for transmittal to the root switch device 208.) This is in contrast to conventional systems, which as discussed above would have utilized the lower designated bridge identifier received from the designated switch device 204 on the second link provided on the connection 210 (e.g., "BRIDGE ID 2" in this example), as compared to the designated bridge identifier received from the designated switch device 206 on the first link provided on the connection 212 (e.g., "BRIDGE ID 3" in this example), to select the second link provided on the connection 210 as the active link, resulting in the triggering of a topology-change event that forces traffic to reconverge on that new active link, and introducing processing overhead and possible data losses.

With reference to the STP link selection system 400, at blocks 510 and 512, the STP link selection engine 304 in the switch device 402 may operate to transmit communications via the LAG 702 that is only provided on the connection 412 to the switch device 406 (e.g., for transmittal to the switch device 408.) This is in contrast to conventional systems, which as discussed above would have utilized the lower designated bridge identifier received from the switch device 406 on the link provided on the connection 704 (e.g., "BRIDGE ID 1" in this example), as compared to the designated bridge identifier received from the aggregated switch device 700 on the LAG 702 that was provided on the connections 410 and 412, and that is now only provided on the connection 412 (e.g., the designated bridge identifier for the switch device 404/VLT primary device "BRIDGE ID 2"), to select the link provided on the connection 704 as the active link, resulting in the triggering of a topology-change event that forces traffic to reconverge on that new active link, and introducing processing overhead and possible data losses. The method 500 then returns to block 506, and may continue to loop through blocks 506-512 for any additional designated switch devices to which a link becomes available to the non-designated switch device.

Figure 8A:
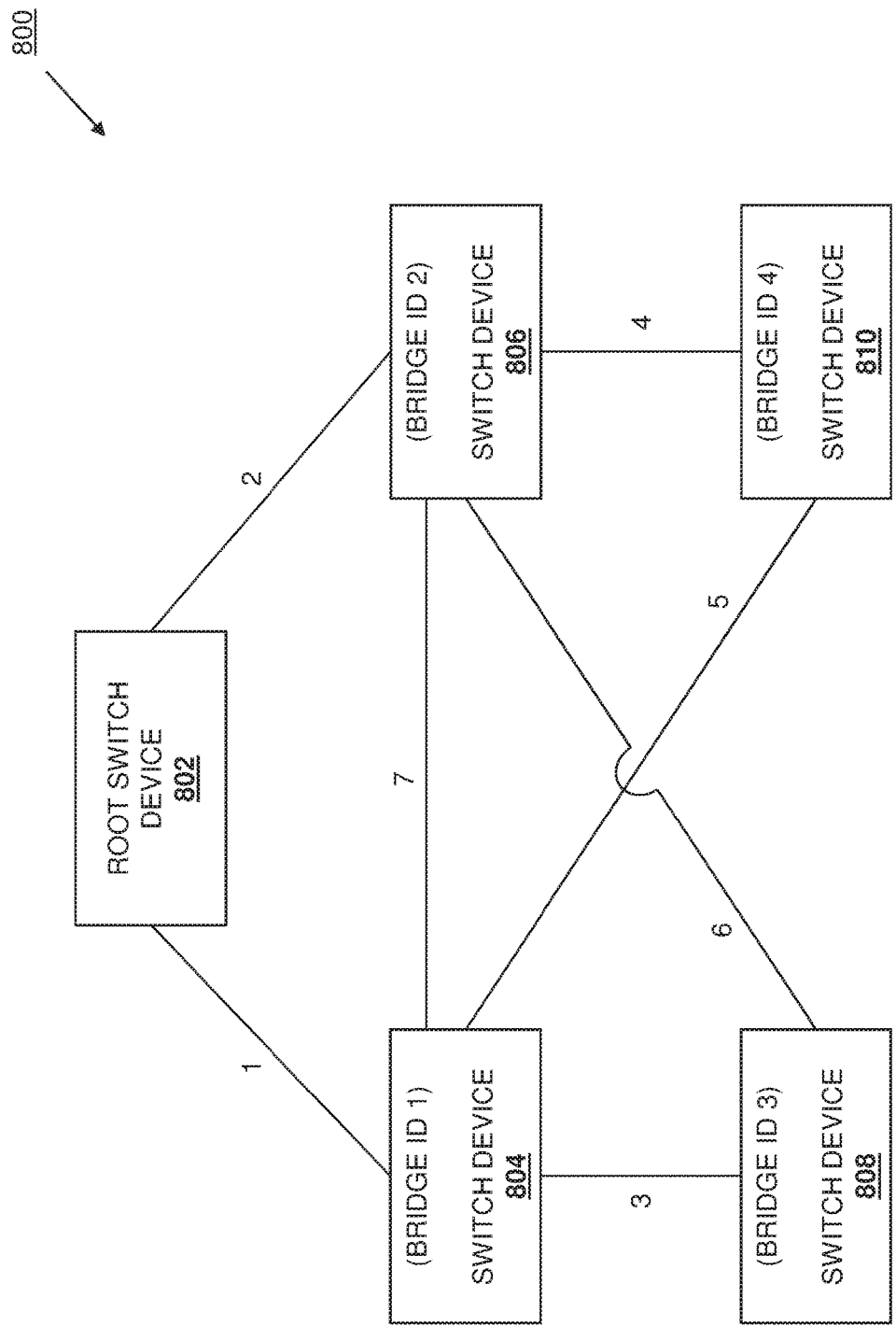
FIG. 8A is a schematic view illustrating an embodiment of an STP link selection system.

Referring now to FIG. 8A, an embodiment of an STP link selection system 800 is illustrated in order to provide a specific example of just some of the benefits of the present disclosure. In the illustrated embodiment, the STP link selection system 800 includes a root switch device 802, a switch device 804 with a first designated bridge identifier ("BRIDGE ID 1"), a switch device 804 with a second designated bridge identifier ("BRIDGE ID 2") that is higher than the first bridge identifier, a switch device 804 with a third designated bridge identifier ("BRIDGE ID 3") that is higher than the second bridge identifier, and a switch device 804 with a fourth designated bridge identifier ("BRIDGE ID 4") that is higher than the third bridge identifier. FIG. 8A illustrates a plurality of links between the switch devices in the STP link selection system 800, with each link indicating an order in which it become available, and each link having an identical root path cost to the root switch device 802. As such a first link between the root switch device 802 and the switch device 804 become available first (and is labeled "1"), a second link between the root switch device 802 and the switch device 806 become available second (and is labeled "2"), a third link between the switch device 804 and the switch device 808 become available third (and is labeled "3"), a fourth link between the switch device 806 and the switch device 810 become available fourth (and is labeled "4"), a fifth link between the switch device 804 and the switch device 810 become available fifth (and is labeled "5"), a sixth link between the switch device 806 and the switch device 808 become available sixth (and is labeled "6"), a seventh link between the switch device 804 and the switch device 806 become available seventh (and is labeled "7").

Figure 8B:
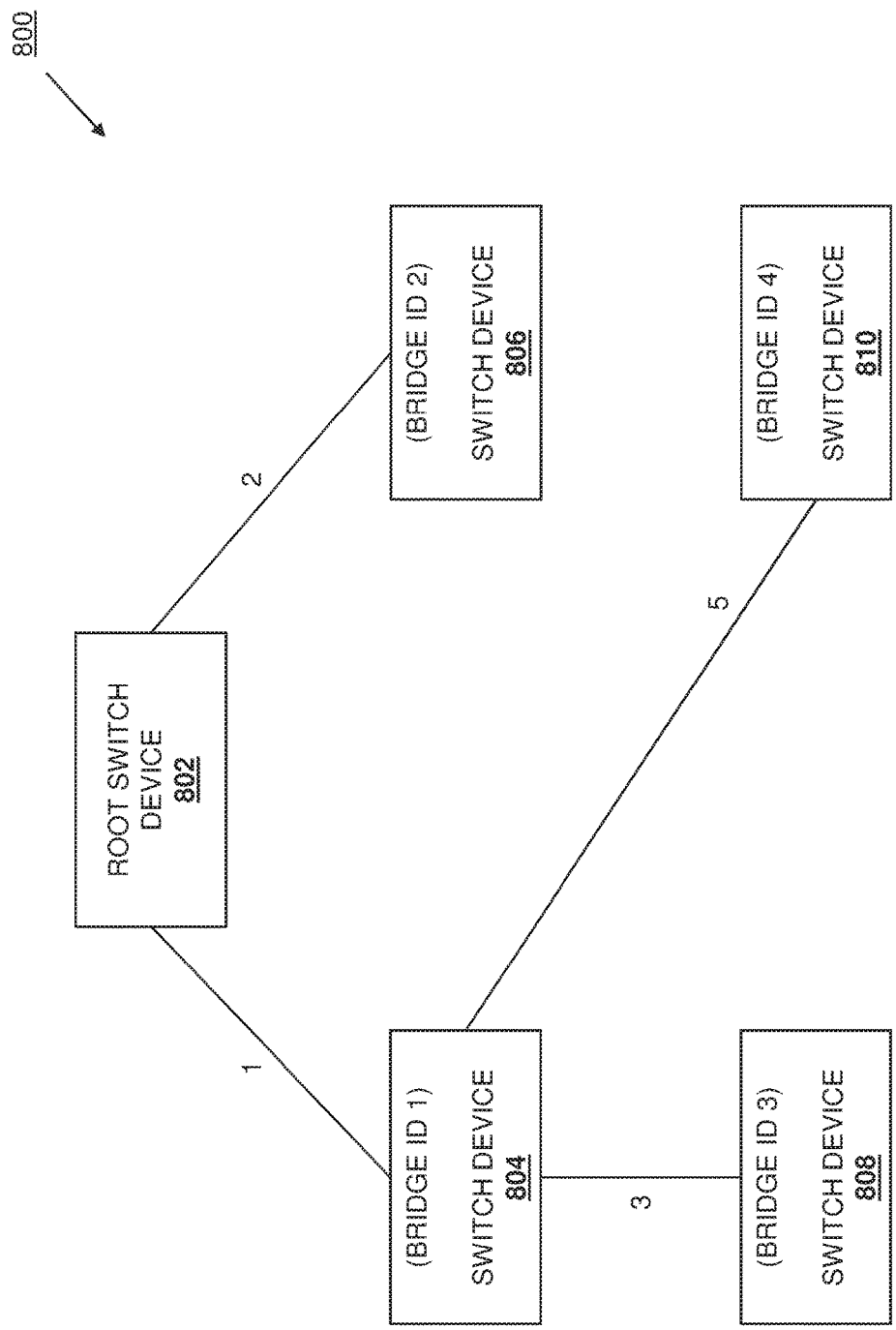
FIG. 8B is a schematic view illustrating an embodiment of the STP link selection system of FIG. 8A with STP links selected via conventional techniques.

FIG. 8B illustrates the resulting active links in the STP link selection system 800 that are provided via conventional STP link selection, which results in the transmission of communications via the first link between the root switch device 802 and the switch device 804, the second link between the root switch device 802 and the switch device 806, the third link between the switch device 804 and the switch device 808, and the fifth link between the switch device 804 and the switch device 810, as well as the blocking of communications via the fourth link between the switch device 806 and the switch device 810, the sixth link between the switch device 806 and the switch device 808, and the seventh link between the switch device 804 and the switch device 806 (with those blocked links not visible in FIG. 8B). As would be understood by one of skill in the art in possession of the present disclosure, the STP link selection illustrated in FIG. 8B is primarily due to the switch device 808 selecting the third link over the sixth link due to the switch device 804 having a lower bridge identifier than the switch device 806, and the switch device 810 selecting the fifth link over the fourth link due to the switch device 804 having a lower bridge identifier than the switch device 806.

Figure 8C:
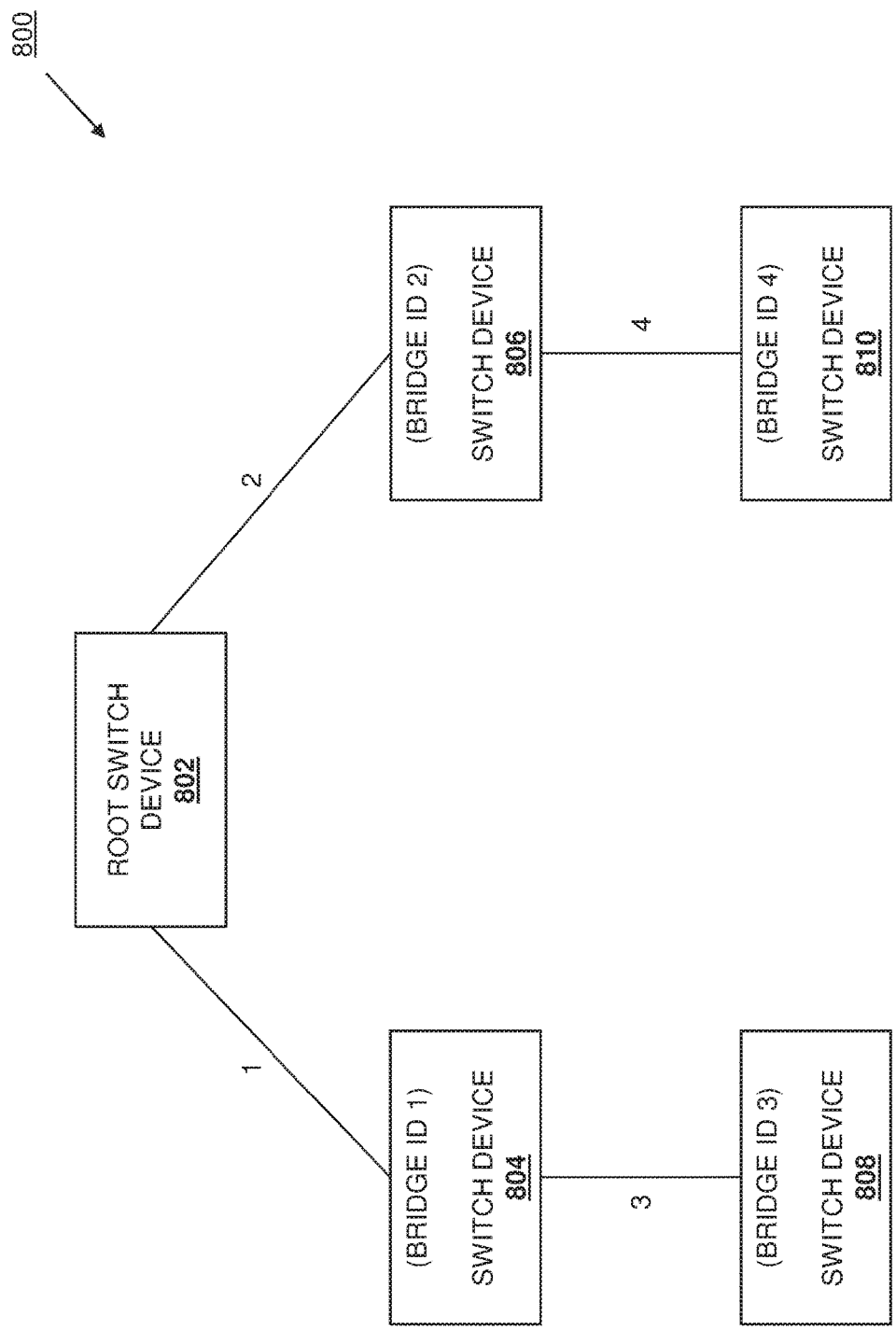
FIG. 8C is a schematic view illustrating an embodiment of the STP link selection system of FIG. 8A with STP links selected via the teachings of the present disclosure.

FIG. 8C illustrates the resulting active links in the STP link selection system 800 that are provided via STP link selection according to the teachings of the present disclosure, which results in the transmission of communications via the first link between the root switch device 802 and the switch device 804, the second link between the root switch device 802 and the switch device 806, the third link between the switch device 804 and the switch device 808, and the fourth link between the switch device 806 and the switch device 810, as well as the blocking of communications via the fifth link between the switch device 804 and the switch device 810, the sixth link between the switch device 806, and the switch device 808, and the seventh link between the switch device 804 and the switch device 806 (with those blocked links not visible in FIG. 8C). As would be understood by one of skill in the art in possession of the present disclosure, the STP link selection illustrated in FIG. 8C is primarily due to the switch device 810 selecting the fourth link over the fifth link due to the fourth link having been established earlier than the fifth link (despite the switch device 804 having a lower bridge identifier than the switch device 806.) As will be appreciated by one of skill in the art in possession of the present disclosure, the STP link selection illustrated in FIG. 8C provides for more efficient communication paths that those provided via the convention STP link selection illustrated in FIG. 8B.

Thus, systems and methods have been described that provide for the continued use of an active link provided via a first port that has received a first designated bridge identifier when a second port provides a subsequent link that has the same root path cost as the active link and that second port receives a second designated bridge identifier that is lower than the first designated bridge identifier. As such, the subsequent availability of the second link associated with the lower designated bridge identifier following the use of the active link does not cause the repeating of the active link selection process that would conventionally cause the second link to be selected as the new active link, thus preventing the triggering of a topology-change event that forces traffic to reconverge on that new active link, and reducing the processing overhead and possible data losses that occur in conventional STP link selection systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Spanning Tree Protocol (STP) link selection system, comprising:
 a root switch device;
 a first designated switch device that provides a first path to the root switch device;
 a second designated switch device that provides a second path to the root switch device, wherein the first designated switch device and the second designated switch device are aggregated to provide an aggregated designated switch device that uses a first designated switch identifier of the first designated switch device; and
 a non-designated switch device that is connected to the first designated switch device and the second designated switch device, wherein Link Aggregation Group (LAG) is provided between the non-designated switch device and the aggregated designated switch device, and wherein the non-designated switch device is configured to:
 receive, from the first designated switch device, a first communication that indicates that a first link that is provided to the first designated switch device and that is included in the LAG is available, and that identifies:
 a first root path cost; and
 the first designated switch device identifier;
 designate, in response to receiving the first communication, the first link as an active link;
 receive, from the second designated switch device subsequent to receiving the first communication, a second communication that indicates that a second link provided to the second designated switch device is available and that includes:
 a second root path cost that is equal to the first root path cost; and
 a second designated switch device identifier that is lower than the first designated switch device identifier;
 determine that a third link that is provided to the second designated switch device and that is included in the LAG has become unavailable;
 designate, in response to receiving the second communication and determining that the third link has become unavailable, the second link as a non-active link;
 transmit, based on the designation of the first link as the active link, communications via the first link to the first designated switch device for transmittal to the root switch device; and
 block, based on the designation of the second link as the non-active link, communications via the second link to the second designated switch device.

2. The system of claim 1, wherein each of the first communication and the second communication include Bridge Protocol Data Unit (BPDU) communications.

3. The system of claim 1, wherein the designating the second link as the non-active link includes:
 determining that the second root path cost is equal to the first root path cost and, in response, determining that the second communication was received subsequent to the first communication, wherein the designating the second link as the non-active link is performed in response to determining that the second communication was received subsequent to the first communication.

4. The system of claim 1, wherein the designating the second link as the non-active link includes:
 determining that the second root path cost is equal to the first root path cost;
 detecting an instruction to designate the second link as the active link and the first link as the non-active link based on the second designated switch device identifier being lower than the first designated switch device identifier; and
 overriding the instruction such that the second link remains designated as the non-active link and the first link remains designated as the active link.

5. The system of claim 1, wherein the designating the second link as the non-active link includes:
 determining that the second root path cost is equal to the first root path cost and, in response, determining that the second communication was received subsequent to the first communication, wherein the designating the second link as the non-active link is performed in response to determining that the second communication was received subsequent to the first communication.

6. An Information Handling System (IHS), comprising:
 a processing system; and
 a memory system that is coupled to the processing system and that includes instructions that, when executed by the processing system, cause the processing system to provide a Spanning Tree Protocol (STP) link selection engine that is configured to:

receive, from a first designated switch device that is aggregated with a second designated switch device to provide an aggregated designated switch device that uses a first designated switch identifier of the first designated switch device and that is coupled to a Link Aggregation Group (LAG), a first communication that indicates that a first link that is provided to the first designated switch device and that is included in the LAG is available, and that identifies:

a first root path cost; and the first designated switch device identifier;

designate, in response to receiving the first communication, the first link as an active link;

receive, from a second designated switch device subsequent to receiving the first communication, a second communication that indicates that a second link provided to the second designated switch device is available and that includes:

a second root path cost that is equal to the first root path cost; and a second designated switch device identifier that is lower than the first designated switch device identifier;

determine that a third link that is provided to the second designated switch device and that is included in the LAG has become unavailable;

designate, in response to receiving the second communication and determining that the third link has become unavailable, the second link as a non-active link;

transmit, based on the designation of the first link as the active link, communications via the first link to the first designated switch device for transmittal to a root switch device; and block, based on the designation of the second link as the non-active link, communications via the second link to the second designated switch device.

7. The IHS of claim 6, wherein each of the first communication and the second communication include Bridge Protocol Data Unit (BPDU) communications.

8. The IHS of claim 6, the designating the second link as the non-active link includes:

determining that the second root path cost is equal to the first root path cost and, in response, determining that the second communication was received subsequent to the first communication, wherein the designating the second link as the non-active link is performed in response to determining that the second communication was received subsequent to the first communication.

9. The IHS of claim 6, wherein the designating the second link as the non-active link includes:

determining that the second root path cost is equal to the first root path cost;

detecting an instruction to designate the second link as the active link and the first link as the non-active link based on the second designated switch device identifier being lower than the first designated switch device identifier; and overriding the instruction such that the second link remains designated as the non-active link and the first link remains designated as the active link.

10. The IHS of claim 6, wherein the designating the second link as the non-active link includes:

determining that the second root path cost is equal to the first root path cost and, in response, determining that the second communication was received subsequent to the first communication, wherein the designating the second link as the non-active link is performed in response to determining that the second communication was received subsequent to the first communication.

11. The IHS of claim 10, wherein the STP link selection engine is configured to:

detecting an instruction to designate the second link as the active link and the first link as the non-active link based on the second designated switch device identifier being lower than the first designated switch device identifier; and overriding the instruction such that the second link remains designated as the non-active link and the first link remains designated as the active link.

12. A method for selecting Spanning Tree Protocol (STP) links, comprising:

receiving, by a non-designated switch device from a first designated switch device that is aggregated with a second designated switch device to provide an aggregated designated switch device that uses a first designated switch identifier of the first designated switch device and that is coupled via a Link Aggregation Group (LAG) to the non-designated switch device, a first communication that indicates that a first link that is provided to the first designated switch device and that is included in the LAG is available, and that identifies:

a first root path cost; and the first designated switch device identifier;

designating, by the non-designated switch device in response to receiving the first communication, the first link as an active link;

receiving, by the non-designated switch device from a second designated switch device subsequent to receiving the first communication, a second communication that indicates that a second link provided to the second designated switch device is available and that includes:

a second root path cost that is equal to the first root path cost; and a second designated switch device identifier that is lower than the first designated switch device identifier;

determining, by the non-designated switch device, that a third link that is provided to the second designated switch device and that is included in the LAG has become unavailable;

designating, by the non-designated switch device in response to receiving the second communication and determining that the third link has become unavailable, the second link as a non-active link;

transmitting, by the non-designated switch device based on the designation of the first link as the active link, communications via the first link to the first designated switch device for transmittal to a root switch device; and blocking, by the non-designated switch device based on the designation of the second link as the non-active link, communications via the second link to the second designated switch device.

13. The method of claim 12, wherein each of the first communication and the second communication include Bridge Protocol Data Unit (BPDU) communications.

14. The method of claim 12, the designating the second link as the non-active link includes:

determining that the second root path cost is equal to the first root path cost and, in response, determining that the second communication was received subsequent to the first communication, wherein the designating the second link as the non-active link is performed in response to determining that the second communication was received subsequent to the first communication.

15. The method of claim 12, wherein the designating the second link as the non-active link includes:
  determining that the second root path cost is equal to the first root path cost;
  detecting an instruction to designate the second link as the active link and the first link as the non-active link based on the second designated switch device identifier being lower than the first designated switch device identifier; and
  overriding the instruction such that the second link remains designated as the non-active link and the first link remains designated as the active link.

16. The method of claim 12, wherein the designating the second link as the non-active link includes:
  determining that the second root path cost is equal to the first root path cost and, in response, determining that the second communication was received subsequent to the first communication, wherein the designating the second link as the non-active link is performed in response to determining that the second communication was received subsequent to the first communication.

17. The method of claim 16, further comprising:
  detecting, by the non-designated switch device, an instruction to designate the second link as the active link and the first link as the non-active link based on the second designated switch device identifier being lower than the first designated switch device identifier; and
  overriding, by the non-designated switch device, the instruction such that the second link remains designated as the non-active link and the first link remains designated as the active link.

* * * * *